US005589767A

United States Patent [19]

Akamatsu

[11] Patent Number: 5,589,767
[45] Date of Patent: Dec. 31, 1996

[54] MECHANISM FOR THE ATTACHMENT OF A SPEED SENSOR TO A TRAIN WHEEL INCLUDING A BEARING AND A CONNECTION LINK WITH A SHOCK ABSORBING BUSHING

[75] Inventor: Osamu Akamatsu, Akashi, Japan

[73] Assignee: NABCO Ltd., Kobe, Japan

[21] Appl. No.: 223,390

[22] Filed: Apr. 5, 1994

[30] Foreign Application Priority Data

Apr. 6, 1993 [JP] Japan ................................. 5-105055

[51] Int. Cl.⁶ .............................. G01P 3/48; G01R 33/02; B61L 11/08
[52] U.S. Cl. .......................... 324/173; 324/262; 246/249
[58] Field of Search .................................. 324/173, 174, 324/207.25, 262, 166; 384/446, 448; 246/249

[56] References Cited

U.S. PATENT DOCUMENTS

| | | | |
|---|---|---|---|
| 3,614,615 | 10/1971 | Cass ...................................... | 324/174 X |
| 4,349,780 | 9/1982 | Zuber et al. ........................... | 324/262 |
| 4,521,731 | 6/1985 | Uyeda et al. .......................... | 324/174 |
| 4,845,428 | 7/1989 | Kamaji .................................. | 324/174 |
| 4,978,234 | 12/1990 | Ouchi .................................... | 384/448 |
| 5,140,261 | 8/1992 | Seo et al. .............................. | 324/173 |
| 5,183,341 | 2/1993 | Ouchi et al. ........................... | 384/448 |
| 5,248,939 | 9/1993 | Brauer .................................. | 324/207.25 |
| 5,263,366 | 11/1993 | Sakamoto .............................. | 73/118.1 |
| 5,289,120 | 2/1994 | Moretti et al. ......................... | 324/207.25 |
| 5,332,964 | 7/1994 | Ouchi .................................... | 324/174 |

*Primary Examiner*—Sandra L. O'Shea
*Assistant Examiner*—Roger Phillips
*Attorney, Agent, or Firm*—John B. Sotak

[57] ABSTRACT

A mechanism for the attachment of a speed sensor to a vehicle comprising a rotary body for attachment to an end of a wheel axle such that the rotary body rotates with the wheel axle, the rotary body having an outer peripheral surface, the outer peripheral surface having a gear wheel with teeth; a sensor mounting body within which the rotary body rotates by means of a bearing therebetween; a speed sensor attached to the sensor mounting body and aligned opposite to the gear wheel with teeth of the rotary body, the bearing maintaining a predetermined gap between the speed sensor and the gear wheel with teeth, the teeth providing the change in magnetic field sensed by the speed sensor when the rotary body is rotating with the wheel axle so that the speed sensor generates a signal corresponding to the rotational speed of the wheel axle; and a connection link through which the sensor mounting body is connected to a frame of the vehicle.

4 Claims, 4 Drawing Sheets

MECHANISM FOR THE ATTACHMENT OF A SPEED SENSOR TO A TRAIN WHEEL INCLUDING A BEARING AND A CONNECTION LINK WITH A SHOCK ABSORBING BUSHING

FIELD OF THE INVENTION

The present invention relates to a mechanism for attaching a speed sensor to a railroad car so that the speed sensor maintains a predetermined gap with respect to a rotary body attached to the end of the wheel axle thereby generating a signal corresponding to the rotation of the wheel axle.

BACKGROUND OF THE INVENTION

Railcars are constructed in such a manner as to be provided with a pair of wheel axles. One wheel axle is positioned at the front and the other wheel axle at the back of the railcar. Normally, the wheel axles are set up so that they can rotate freely within a frame of a railcar vehicle. A speed sensor, which is intended to detect the speed of rotation of the wheel axle as a means of controlling the skidding of the wheels, is installed between the wheel axle and the frame. This is achieved by utilizing a mechanism for attaching the speed sensor to the vehicle frame in such a manner that a predetermined gap is maintained between the sensor and one or more teeth of a rotary body, the rotary body being attached to an end of a wheel axle.

An example of a known speed sensor attachment mechanism of the above mentioned type suitable for the construction of a passenger railroad car is shown in FIG. 3. In this construction, a wheel axle 51, which supports wheels not shown in the drawings, consists of a support axle portion 51a, which is intended to support a wheel; a threaded portion 51b, onto which a bearing cap 53 has been screwed; and an axle end-portion 51c of [the] wheel axle 51. All of these parts are identical on both ends of wheel axle 51. A bearing 52 is inserted into a journal box 70 which is provided on a side of the frame of the railroad car, and is fixed in place by bearing cap 53. A rotary body 54 which rotates together with the wheel is fitted onto end portion 51c of wheel axle 51. Rotary body 54 has an outer peripheral surface on which a gear wheel having teeth and valleys 54a is formed. Gear wheel 54a is installed with a predetermined gap $\delta$ with respect to speed sensor 55. Speed sensor 55 is rigidly attached to journal box 70 through an appropriate bracket 70a.

Gear teeth and valleys 54a are capable of exerting an effect on the force lines of an electromagnetic field. Rotary body 54 has a through opening 54b which is fitted over end portion 51c of wheel axle 51 and is connected to bearing cap 53 by a bolt 56, whereby rotary body 54 can rotate together with wheel axle 51. Speed sensor 55 may comprise a conventional electromagnetic sensor. Such a sensor is rigidly attached on both sides of journal box 70 of the railcar frame. The end of the aforementioned electromagnetic sensor is installed so that it can determine the number of revolutions of wheel axle 51 by detecting variations in the magnetic field caused by the interaction of teeth and valleys 54a with the end of the sensor. The above construction requires that a gap $\delta$ of a predetermined magnitude be maintained between teeth and valleys 54a and speed sensor 55. If gap $\delta$ were to change, it would be impossible to perform measurements because of fluctuations in the output of speed sensor 55. In the event that the rotary body 54 is attached to end portion 51c of wheel axle 51, it is required that its mounting be carried out with great accuracy. Therefore, in newly constructed railway cars of the latest models, it is required that the above mentioned ends of the wheel axles be machined with extremely high accuracy to satisfy the given requirements.

However, when the speed sensor mechanism is attached to the axles of conventional railcars of the type already in use, ends 51c of wheel axle 51, even though they are coaxial, as a result of variations in the diameter D1 of the axle, fail to satisfy the above mentioned accuracy requirements. These axle ends therefore have to be machined in such a way that the deviations from the above specifications will be within the range of ±0.3 mm. For this reason, even if ends 51c have a tolerance identical to that of through opening 54b of rotary body 54, in some cases a certain amount of play may occur in the overlapping portion between the two, whereby the aforementioned gap $\delta$ between the end[s] of speed sensor 55 and the ends of gear wheel 54a may vary, making accurate measurement of wheel rotation impossible.

It has been proposed to solve this problem by measuring the actual finished dimensions at the end 51c of wheel axle 51, and then subject through opening 54b of rotary body 54 to such treatment as will result in dimensions that will match the actually measured dimensions. An alternative proposed solution involves retreating or refinishing the end 51c of wheel axle 51. The first method calls for an increase in costs, whereas the second method calls for temporarily dismantling the wheel axle from the railway car.

Because those railway cars which have the wheel construction of the type shown in FIG. 4 do not by themselves satisfy the requirements for passenger comfort, the construction of wheel axles for such cars is normally provided with a saddle 59 installed on a bearing 58 which is installed on a periphery of wheel axle 57, which in turn is inserted into wheel 61. Car frame 60 is supported by saddle 59. The gap which exists between bearing 58 and saddle 59 is not constant, and a large amount of play occurs between saddle 59 and car frame 60. In view of the above construction of the wheel axles, the speed sensor needs to be attached to frame 60 which constitutes a stable stationary element. However, since saddle 59 is present between car frame 60 and bearing 58, a gap on the order of some millimeters occurs between frame 60 and rotary body 54 attached to end 51c of wheel axle 57. Therefore, such a construction makes it practically impossible to install rotary body 54 in such a way as to eliminate fluctuations in the magnitude of gap $\delta$ between gear wheel 54a of rotary body 54 and the end of the speed sensor 55 attached to the side of vehicle frame 60. In FIG. 4, reference numeral 62 designates a bolster anchor, reference numeral 63 indicates a journal box block, and reference numeral 64 represents a bolster.

SUMMARY OF THE INVENTION

The present invention is aimed at a solution of the above problems and provides a mechanism for the attachment of a speed sensor to a railcar vehicle so that the speed sensor maintains a predetermined gap with respect to a rotary body attached to an end of the wheel axle. Such speed sensor attachment mechanism includes a rotary body for attachment to an end of the wheel axle such that the rotary body rotates with the wheel axle. The rotary body includes an outer peripheral surface having a gear wheel with teeth. A sensor mounting body, within which the rotary body rotates by means of a bearing therebetween, serves as the mounting to which a speed sensor attaches. The speed sensor is aligned opposite to the gear wheel teeth of the rotary body. The predetermined gap between the speed sensor and the gear wheel teeth is maintained through the bearing. The gear wheel teeth provide the change in magnetic field sensed by the speed sensor when the rotary body is rotating with the wheel axle. As the rotary body rotates in unison with the wheel axle, the speed sensor generates a signal corresponding to the rotational speed of the wheel axle. A connection link connects at one end to the frame of the railcar and at another end to the speed sensor thereby connecting the sensor mounting body to the vehicle frame. A displacement absorption means for preventing transmission of vibration from both the vehicle frame and the wheel axle to the speed sensor attachment mechanism so as to protect the speed sensor attachment mechanism from damage is provided. Preferably the connection link includes a first arm having two ends. The first arm at one end thereof, projecting from the sensor mounting body and at an other end attached to a first joint. The second arm at one end connected to the vehicle frame through a second joint and at the other end attached to the first joint.

Preferably, the displacement absorption means includes a bushing contained in each of the first and second joints, so that as the vehicle vibrates during operation the bushing resiliently deforms thereby absorbing forces caused by the vibration between the vehicle and the wheel axle. A spherical bearing can be substituted for the bushing.

OBJECTS OF THE INVENTION

The primary object of the invention is to provide a mechanism for the attachment of a speed sensor to a railcar vehicle so that a predetermined gap is maintained between a rotary body attached to an end of a wheel axle and the speed sensor attached to a frame of the railcar.

Another object of the present invention is to provide a mechanism for the attachment of a speed sensor to a railcar vehicle that does not require retreatment, refinishing or other modification of a wheel axle end prior to installation.

Still another object of the present invention is to provide a mechanism for the attachment of a speed sensor to a railcar vehicle that does not require disassembly of a wheel axle prior to installation.

Yet another object of the present invention is to provide a mechanism for the attachment of a speed sensor to a railcar vehicle that can be either attached to existing railcar axles or wheels or incorporated into new railcar axle designs.

DETAILED DESCRIPTION OF THE INVENTION

Figure 1:
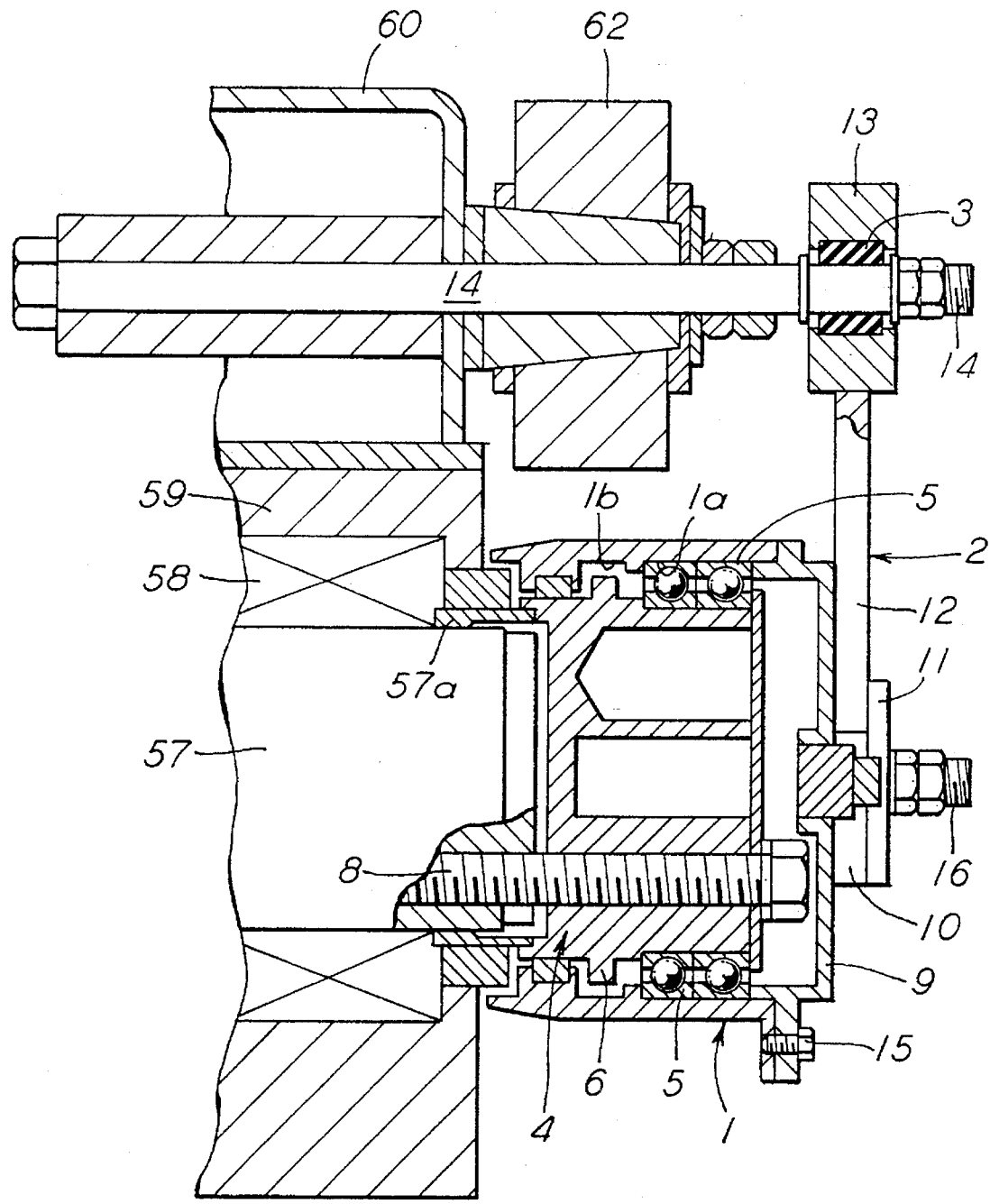
FIG. 1 is a sectional view of the speed sensor attachment mechanism according to the present invention.
Figure 2:
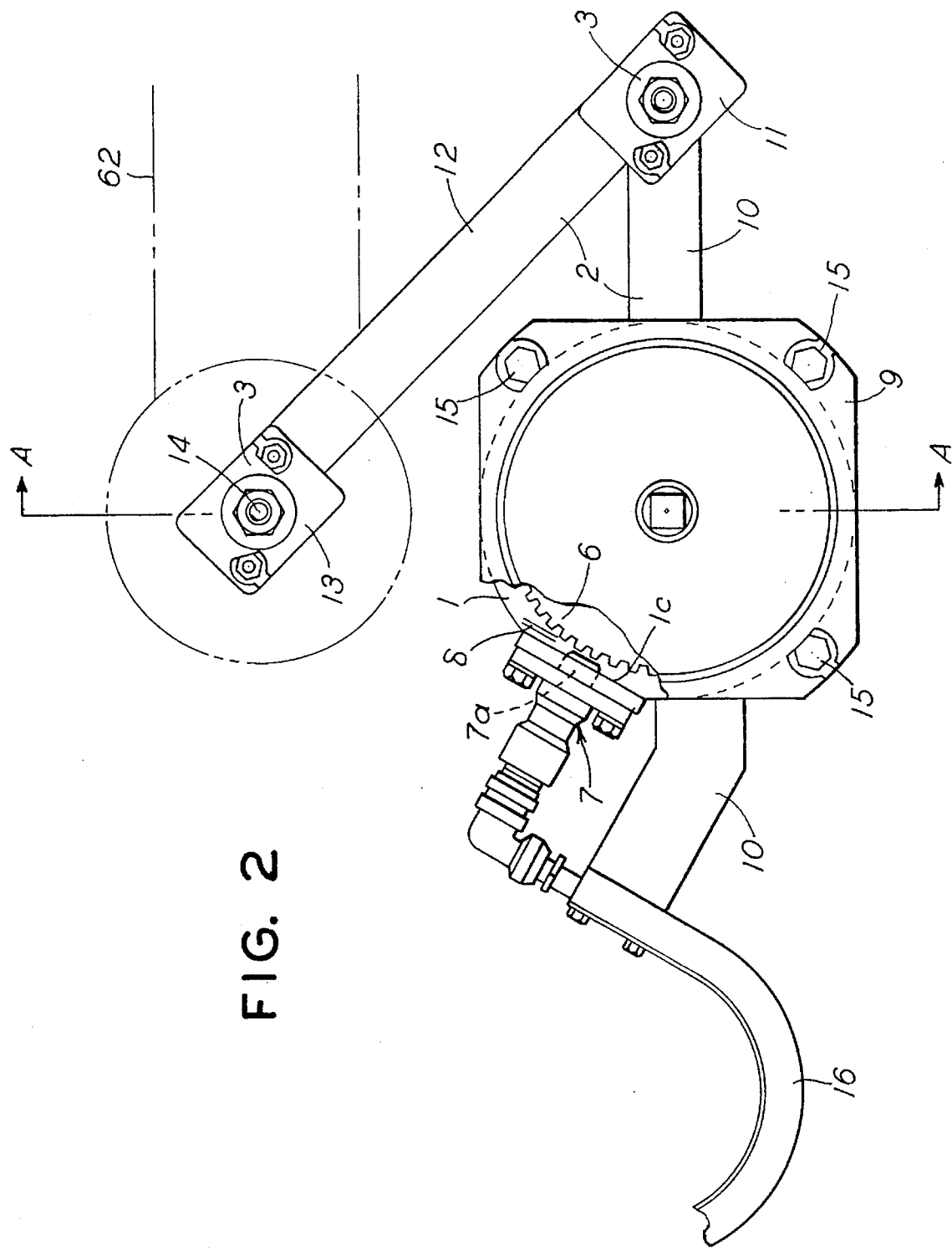
FIG. 2 is a side view of the speed sensor attachment mechanism according to the present invention.
Figure 3:
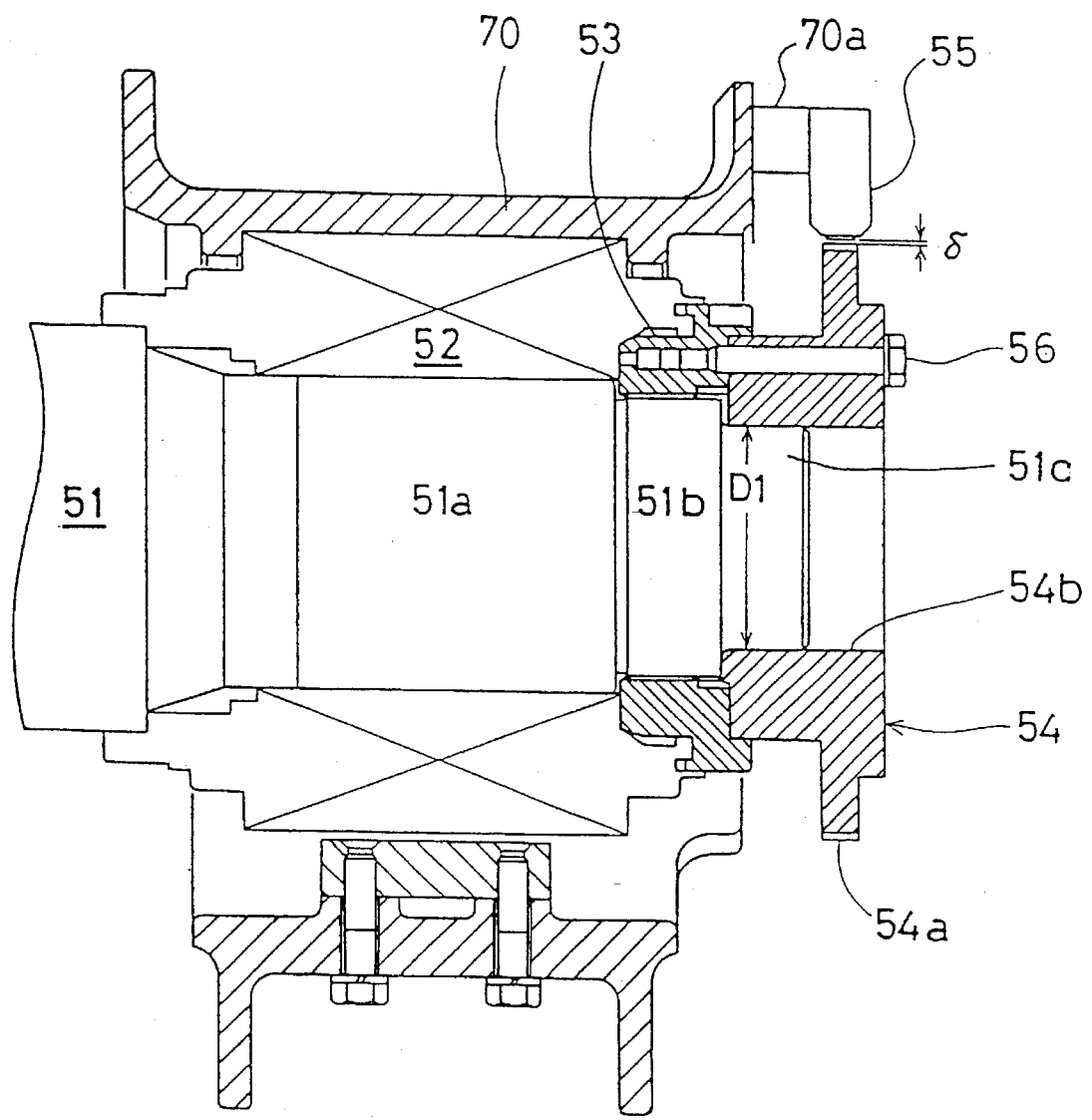
FIG. 3 is a sectional view of a known speed sensor attachment mechanism.

FIGS. 1 and 2 illustrate the essential details of the present mechanism for the attachment of a speed sensor 7 to a railcar vehicle so that a predetermined gap δ is maintained between a rotary body 4 attached to an end of a wheel axle 57 and the speed sensor 7 attached to a frame 60 of the railcar.

In order to solve the problems described above, the present invention provides a mechanism for attaching a speed sensor 7 comprising: a rotary body 4 for attachment to an end face of a wheel axle 57 such that rotary body 4 rotates with wheel axle 57, rotary body 4 having an outer peripheral surface with a gear wheel with teeth 6; a sensor mounting body 1 within which rotary body 4 rotates by means of a bearing 5 therebetween; a speed sensor 7 attached to sensor mounting body 1 and aligned opposite to the gear wheel with teeth 6 of rotary body 4, the bearing 5 maintaining a predetermined gap between speed sensor 7 and the gear wheel with teeth 6, the teeth 6 providing the change in magnetic field sensed by speed sensor 7 when rotary body 4 is rotating with wheel axle 57 so that speed sensor 7 generates a signal corresponding to the rotational speed of wheel axle 57; and a connection link 2 through which sensor mounting body 1 is connected to a vehicle frame 60. In addition, the invention further provides the aforementioned connection link 2 with a displacement absorption means 3.

Speed sensor 7 is attached to sensor mounting body 1. By means of a bearing 5, the gap δ between speed sensor 7 and rotary body 4 remains constant and unchanged within the limits of the accuracy of bearing 5. Furthermore, because sensor mounting body 1 is connected to stationary frame 60, through connection link 2, sensor mounting body 1 which supports speed sensor 7 cannot rotate together with rotary body 4.

Figure 4:
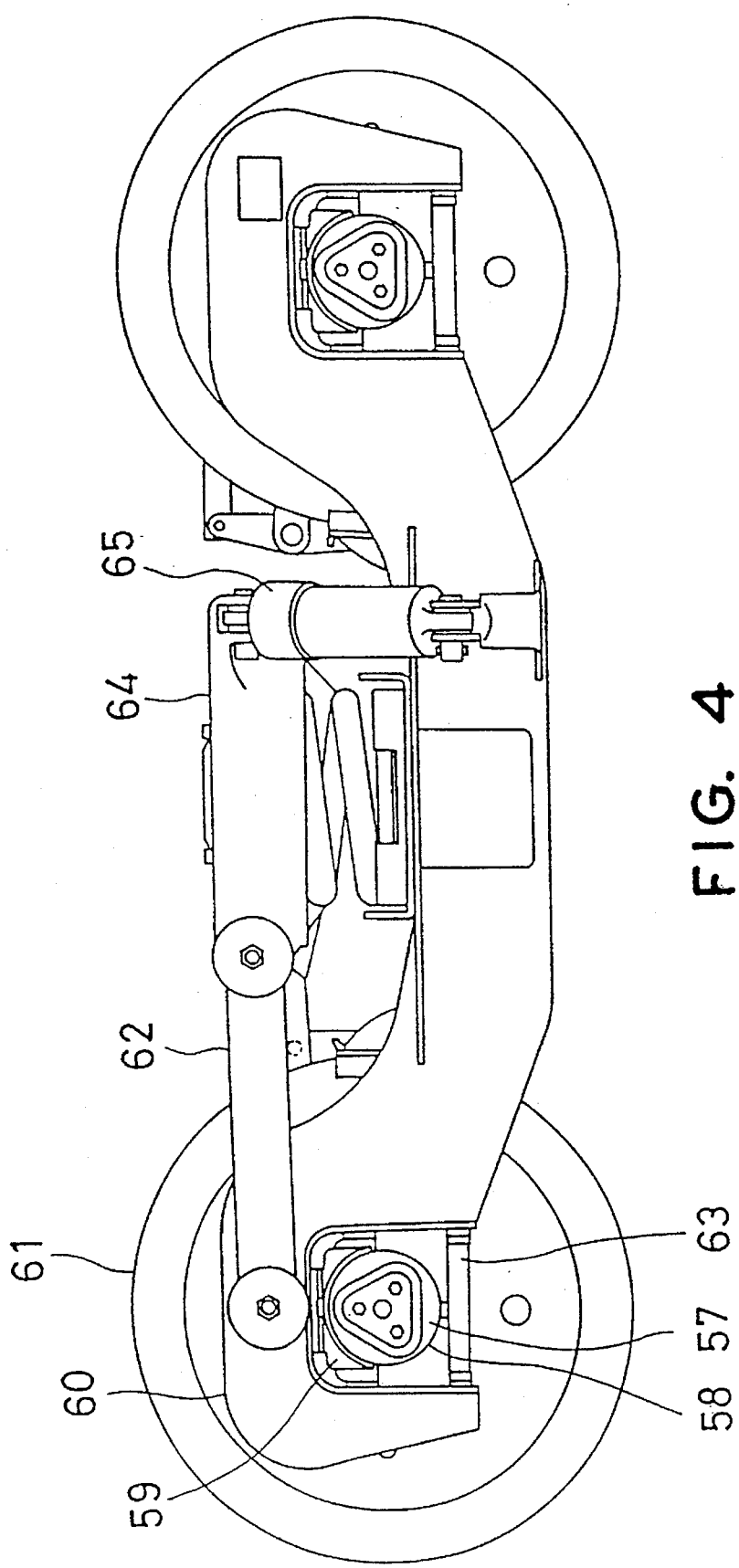
FIG. 4 is a view of a known wheel-supporting unit of a railcar.

The invention will be further described by way of a practical example with reference to the accompanying drawings. FIG. 1 is a sectional view in the direction of line A—A of FIG. 2 and represents a cross-section through the speed sensor attachment mechanism of the invention. FIG. 2 is a side view. In FIGS. 1 and 2, reference numeral 1 designates a sensor mounting body, reference numeral 2 indicates a connection link, reference numeral 4 denotes a rotary body, reference numeral 5 designates a bearing, reference numeral 6 represents a gear wheel with teeth which is provided on rotary body 4, reference numeral 7 identifies a speed sensor, and reference numerals 11 and 13 each correspond to a joint, the joints incorporating the displacement absorption means in the form of a bushing 3. Reference numeral 57 designates the same structural elements of a wheel axle of a railroad car which operate in the same manner as those shown in FIG. 4. Therefore, their explanation is omitted from the specification.

In FIG. 1, rotary body 4 is shown inserted into a dust guard 57a of wheel axle 57, and is attached by one or more bolts 8 to the end face of wheel axle 57. Sensor mounting body 1, within which rotary body 4 rotates by means of bearing 5 therebetween, is attached to vehicle frame 60. As shown in FIG. 2, speed sensor 7 is attached to the outer periphery of sensor mounting body 1 so that gap δ between a sensor head 7a and the gear wheel with teeth 6 remains constant and unchanged within the limits of the accuracy of bearing 5. Because, however, rotary body 4 rotates within sensor mounting body 1, special bolt 14, which passes through the center of bolster anchor 62, and sensor-mounting body 1 are connected through a connecting link 2 in the form of a first arm 10 and a second arm 12, so that sensor mounting body 1 and speed sensor 7 are prevented from rotating along with rotary body 4. Furthermore, joints 11 and 13 of connection link 2 contain the displacement absorbing means in the form of bushing 3. The displacement absorption means absorbs the play between special bolt 14 fixed to vehicle frame 60 and wheel axle 57. This eliminates the load which otherwise could act on bearing 5 because of the play.

Now separate units of the device will be described in greater detail. Rotary body 4 has a cylindrical shape and is provided on its outer peripheral surface with gear wheel 6 having teeth and valleys for interaction with the electromagnetic force lines of speed sensor 7. As a result, speed sensor 7 generates signals about the rotation of wheel axle 57. Bearing 5 is inserted into the end of rotary body 4. Bearing 5 also attaches to rotary body 4 as an integral unit. This unit, furthermore, housed within sensor mounting body 1, is attached by one or more bolts 8 to the end-face of wheel axle 57. In order to reduce the weight, the interior of rotary body 4 is made hollow.

The outer periphery of sensor mounting body 1 also has a cylindrical shape, while the inner wall has a portion 1a for receiving bearing 5 and recess 1b for maintaining a predetermined gap with the gear wheel teeth 6 of rotary body 4. Thus, as shown in FIG. 2, which is a side view, there is an opening 1c for insertion of speed sensor 7, which is inserted from outside. Sensor head 7a, which is located on the front end of speed sensor 7, is fixed in such a position so as to provide the predetermined gap δ between the end of sensor head 7a and the gear wheel teeth 6 of rotary body 4. Reference numeral 16 designates a cable guide for the speed sensor.

Connection link 2 has a first arm 10 and a second arm 12 and also joints 11 and 13 which interconnect sensor mounting body 1 with special bolt 14; special bolt 14 being attached to frame 60. Sensor mounting body 1 is thus connected to frame 60 so that it cannot rotate together with rotary body 4. Joints 11 and 13 each contain bushing 3 which act as the displacement absorption means. The resilient deformation of bushings 3 absorbs the play between wheel axle 57 and railcar frame 60. A spherical bearing can be utilized instead of bushing 3. Joints 11 and 13 can be replaced by universal joints.

The following description relates to the sequence for assembly of the aforementioned device. Sensor mounting body 1 and rotary body 4 are assembled at the manufacturing plant. For this purpose, bearing 5 is inserted into rotary body 4 and sensor mounting body 1 is pressed onto rotary body 4. The thus preassembled unit is attached by one or more bolts 8 to the rear wheel of a railroad car at a maintenance shop.

Bolting end cover 9 to sensor mounting body 1 using bolts 15 completes the attachment of the preassembled unit to the wheel. First arm 10, which projects from sensor mounting body 1, is connected to special bolt 14 through second arm 12 via joints 11 and 13. Speed sensor 7 is attached to sensor mounting body 1 and thereafter a cable 16 of speed sensor 7 is attached to an appropriate place.

The attachment of the present invention to a railcar is very simple. The present mechanism does not require adjustments or any other treatment of the surfaces in order to assure the coaxiality between rotary body 4 and wheel axle 57.

Because sensor mounting body 1 is attached to stationary railcar frame 60 by connection link 2, sensor mounting body 1 does not rotate together with rotary body 4. During railcar train transport when wheel axle 57 and/or railcar frame 60 jostle about, bushing 3 of the displacement absorption means will resiliently deform thereby absorbing any vibrational forces which would otherwise be transmitted to rotary body 4 and sensor mounting body 1. The displacement absorption means thus dampens harmful vibration and prevents damage to the main elements of the present invention including sensor mounting body 1, rotary body 4 and bearing 5.

Thus, as has been described above, the mechanism of the present invention provides for the attachment of a speed sensor to a stationary part of a railway car frame by means of a connection link. A rotary body attached to an end of a wheel axle rotates within a sensor mounting body by means of a bearing. The bearing maintains a constant gap δ between the speed sensor, which is mounted to the sensor mounting body, and a gear wheel having teeth and valleys located on an outer peripheral surface of the rotary body. The gear wheel teeth provide the change in magnetic field sensed by the speed sensor when the rotary body rotates with the wheel axle. The speed sensor generates a signal corresponding to the rotation of the wheel axle. The construction described above precludes fluctuations of the aforementioned gap between the speed sensor and the gear wheel teeth of the rotary body. This allows the speed sensor to obtain accurate signals about the rotation from the rotary body. Furthermore, since the connection link is provided with a displacement absorption means, the play which may occur between the railcar frame and the wheel axle can be absorbed, so that the speed signal can be stabilized.

While the best mode for carrying out the invention has been set forth in detail, those persons skilled in the art to which this invention pertains will recognize various alternative ways of practicing the invention without departing from the spirit and scope of the following claims.

I claim:

1. A mechanism for attaching a speed sensor to a railway vehicle comprising:

(a) a rotary body for abutting attachment to an end face of a wheel axle and disposed in a nonsurrounding relationship to such wheel axle such that said rotary body rotates with such wheel axle, said rotary body having an outer peripheral surface, said outer peripheral surface having a gear wheel with teeth;

(b) a sensor mounting body within which said rotary body rotates;

(c) a speed sensor attached to said sensor mounting body and aligned opposite to said gear wheel with teeth of said rotary body, said teeth providing the change in magnetic field sensed by said speed sensor when said rotary body is rotating with such wheel axle so that said speed sensor generates a signal corresponding to the rotational speed of such wheel axle;

(d) a bearing disposed between said rotary body and said sensor mounting body such that said bearing maintains a predetermined gap between said speed sensor and said gear wheel with teeth; and (e) a connection link through which said sensor mounting body is connected to a frame of such vehicle, said connection link comprising a displacement absorption means for preventing transmission of vibration from both such vehicle frame and such wheel axle to said speed sensor attachment mechanism so as to protect said speed sensor attachment mechanism from damage.

2. The speed sensor attachment mechanism of claim 1 wherein said connection link further comprises:

(a) a first arm having two ends, said first arm at one end projecting from said sensor mounting body and at an other end attached to a first joint; and (b) a second arm having two ends, said second arm at one end connected to such vehicle frame through a second joint and at an other end attached to said first joint.

3. The speed sensor attachment mechanism of claim 2 wherein said displacement absorption means comprises a bushing contained in each of said joints so that as such vehicle vibrates during operation said bushing resiliently deforms thereby absorbing forces caused by such vibration between such vehicle frame and such wheel axle.

4. The speed sensor attachment mechanism as recited in claim 2 wherein said displacement absorption means comprises a spherical bearing contained in each of said joints so that as such vehicle vibrates during operation said bearing resiliently deforms thereby absorbing forces caused by such vibration between such vehicle frame and such wheel axle.

* * * * *